INVENTOR,
EMILE ABELES

ATTORNEY

United States Patent Office 3,136,693
Patented June 9, 1964

3,136,693
THERAPEUTIC COMPOSITIONS AND PROCESS
FOR OBTAINING THE SAME
Emile Abeles, 42 Ave. Agustin Dumont,
Malakoff, Seine, France
Filed Nov. 2, 1961, Ser. No. 149,684
11 Claims. (Cl. 167—65)

The present invention relates to therapeutic preparations having an important physiological action as modifiers of vascular spasms and of capillary permeability, and to methods for obtaining them.

The virtures of the red vine leaf obtainable from a so-called dying variety of Vitis vinifera L. (Ampilides) have been praised for a long time as a remedy against internal haemorrhages, the difficulties of the menopause, painful phlebitis and in the treatment of haemorrhoids. The red vine is generally used in a decoction obtained by infusion and constitutes an efficacious remedy in so-called popular medicine.

These properties have however only been observed empirically and it has never yet been possible to obtain, from the natural raw material which this red vine constitutes, a suitable product with a high activity and which is constant in a small volume, and it has been impossible to obtain it by a precise and repeatable process. It is for this reason that the present invention in the first place relates to means allowing concentrated extracts of red vine which are more handy than the leaf to be obtained, the activity of said extracts being of the same nature as the original drug and their principal advantage residing in a much more intense activity.

The preparation of fluid or soft extract according to the techniques usually used in the pharmaceutical art, starting from dried leaves, allow preparations only of very mediocre quality to be obtained. In fact it has been found that:

The extract changes in the course of time. It has a brown colour and forms large quantities of sediments. Its colouring does not correspond to that of the original material.

The physiologically precepticle activity rapidly disappears in the course of time.

In particular the invention allows these drawbacks to be avoided, due to the determination of the necessary and sufficient conditions for obtaining a medicament answering the above-mentioned requirements. According to the invention, there is provided a method for obtaining a substantially stable concentrated extract of red vine (Vitis vinifera), in which dried and crushed leaves of red vine are extracted by a warm hydroalcoholic solvent, and the mixture is acidified after cooling, the filtered liquid then being distilled in vacuo in the presence of a reducer. The invention also provides substantially stable concentrated extracts of red vine (Vitis vinifera), whenever produced by this method. The red vine leaves should preferably be picked in autumn at the time when they have the maximum red colouration.

The leaves should be dried away from the sun and in an atmosphere the temperature of which does not exceed 50° C. They may also be stabilised by conventional methods and in particular by the Perrot-Goris process by means of alcohol vapours.

The dry leaves, whether stabilised or not, are crushed so as to obtain a coarse powder (No. 60 sieve). A greater fineness would not have any particular advantage.

This powder is then extracted by a hydroalcoholic solvent of such a nature that neither the pectins nor the cellulose nor the gums are extracted; an alcoholic content of 50% to 80% is suitable.

This operation should be carried out under heat in order to destroy the oxidases and other ferments and to coagulate the useless proteins. A temperature of 60 to 90° C. is suitable.

This heating operation should take place within a relatively short space of time, preferably less than 1 hour, in order to prevent the activity from being destroyed, a destruction which could result from any prolongation of the heating time. A second stage in the extraction is the addition of a mineral or organic acid such as sulphuric, hydrochloric or acetic acid at concentrations of 1 to 5 per 1000 of the volume of the solvent used. This addition of acid is absolutely necessary to conserve the natural red colouring of the leaf. It should only be carried out when the temperature has dropped to 40 to 50° C. When the mixture is acidified the extraction is carried out under agitation at the temperature of 40 to 50° C. for several hours, but preferably between 1 to 5 hours. This extraction may be repeated several times until colourless filtrates are obtained and the vegeable matter is exhausted.

The filtrates, separated from the marcs, are distilled in a high vacuum at a temperature varying between 20 and 50° C. The presence of a reducing substance is then indispensable and this reducer must be one authorized by medical authorities, e.g., ascorbic acid, metabisulphite etc. The concentration of the reducer is proportional to the dry extract of the filtrate and should be between 1 to 5 per 100 of the latter. The evaporation of the solvent should be carried out until a dark red soft paste is obtained.

This paste must be relieved of its impurities such as chlorophyl, waxes and fatty matter. To this end it may be extracted with a suitable solvent, such as benzene or carbon tetrachloride, or it may be directly dissolved in water, in which these substances are insoluble. Such a solution in water should be carried out at a temperature between 60 and 95° C., with agitation. The volume of water should correspond to one or two times the weight of the original plants. This water should be acidified, the concentration of the acid varying between 0.5 and 2 per thousand. It should contain a reducer of the same type as the first and should be at a concentration of 1 to 5 per 1000. The liquid obtained is dried by a centrifugal machine or separated by filtration.

There are then two possible ways for treating this liquid:

(1) If it is intended to obtain a dry product intended to serve as a raw material for the preparation of non-injectable pharmaceutical substances, the solution may either be concentrated under a high vacuum at a low temperature until a dry powder is obtained, or the solution may be passed into an atomiser ("extract 1").

(2) For injectable preparations, the aqueous solution should undergo fresh processes of purification intended to drive off substances which in time, have a tendency to separate out and be precipitated. The solution is relieved of the tannoids by saturation with sodium chloride. The profuse precipitate is separated by centrifuging or filtration and the solution is put into a counter-current exhausting apparatus or treated by any other similar method. The saline solution is then exhausted by a solvent which is preferably an alcohol which will not mix with water and which can be of a $C_4$ to $C_5$ type. This solvent should contain a proportion of mineral or organic acid varying between 5 and 10 per 1000. After complete exhaustion the alcoholic solution is concentrated to one tenth of its initial volume so as to precipitate part of the sodium chloride which is separated by filtration. This alcoholic solution is then dehydrated by passing it over a drying substance such as anhydrous sodium sulphate, calcium chloride etc.

In order to obtain the active ingredients it is necessary either to desiccate the alcoholic solution in vacuo or to treat it by a solvent such as ether, petroleum ether, or benzene which precipitate a red powder ("extract 2"). In both cases the powder is dried over $P_2O_5$ and stored away from light and damp. It is thus possible to obtain, from the red vine leaf, purified substances which it has been possible to analyse and on which it has been possible to prove that they have an activity of the same type as the natural product. Three aspects have been taken into account for this purpose:

(1) It has been necessary to make sure that the extracts 1 and 2 contain the same substances as the natural product and to identify these substances as far as possible.

(2) It has been necessary to make sure that the extracts 1 and 2 had a similar pharmaceutical action to that of the leaf.

(3) Finally it has been necessary to make sure that these extracts possess valuable properties for human treatment and that they were neither toxic nor were the cause of secondary reactions.

For the first test a solution obtained by the infusion of red vine (this infusion being the first form of which proof of the therapeutic action was made) was compared with extracts 1 and 2. It is important to note that the infusion of red vine gives a red-brown solution, the colour of which passes to brilliant red upon slight acidification. This colouring passes in butanol. This peculiarity has been put to use and the following methods have been used:

Chromatography on paper and ultra-violet and visible spectrum spectrophotometry.

The techniques used in particular were those of Harborne, see:

The Chromatographic Identification of Anthocyanin Pigments; Journal of Chromatography, 1958, 1, 473.

The Chromatography of the Flavonoid Pigments, ibid., 1959, 2, 581.

Spectral Methods of Characterising Anthocyanins, The Biochemical Journal 1958, 70, 22.

If the rough infusion of red vine leaves is passed over Whatman No. 1 paper with Partridge's solvent, the presence of anthocyanic pigments, flavones, tannin, catechin, sugars, esculoside, etc., will be noted.

In order to increase the accuracy of the method the following procedure was adopted:

10 grams of red vine leaf were infused in 100 ml. of water. After cooling, the solution was filtered, saturated with sodium chloride and then exhausted with 5 times 10 ml. of hydrochloric butanol at 1 per 100 (Solution T).

1 gram of extract 1 was put in suspension in 100 ml. of hot water and subjected to the same treatment as the leaf: it was then exhausted by hydrochloric butanol at 1 per 100 (Solution A).

0.2 gram of extract No. 2 was dissolved in 50 ml. of hydrochloric butanol at 1 per 100 (Solution B).

The three solutions, T, A and B were then subjected to the same treatment; to 10 ml. of each solution were added 40 ml. of ethylic ether. This organic form (S) was agitated 5 times with 5 ml. of hydrochloric acid solution at 2 per 1000, the aqueous extracts were brought together and their ether extracted, one portion was hydrolysed by HCl at 20 per 100 for 45 minutes and then extracted with isoamylic alcohol, and the other non-hydrolysed portion was exhausted by butanol. Of these two latter solutions the first corresponds to the anthocyanidines (aglucones) and the second to anthocyanosides (glucosides).

The organic solution (S) was then agitated with 5 times 10 ml. of carbonated water at 2 per 100 and the extracts obtained, relieved of ether, were neutralised and then treated in the same way as the acid extracts.

The flavones (aglucones) and the flavonosides were thus made available separately. Each solution was then subjected to chromatographic and spectral analysis according to Harborne's or Venkataraman's processes (Progress in the Chemistry of Natural Organic Substances, by Zechmester, 17th volume, page 2, 1959, Springer-Verlag, Vienna). The results obtained principally allowed the monoglucosides of delphinodol and malvidol, of quercetine and quercetroside, of koempferol and traces of esculoside to be identified. These results were common to the leaf and to extracts 1 and 2. Therefore, the first object of the invention, i.e., to obtain an extract of red vine corresponding to the natural product, was thus achieved.

By this method it is possible to determine the content of active ingredients by a spectrophotometric measurement in the anthocyanidine soluitions in the isoamylic alcohol on the one hand and in the solution of flavones on the other hand. The absorption spectrum of the anthocyanidine solution is found to be between 600 m$\mu$ and 400 m$\mu$. A characteristic curve is obtained with a maximum of 540 m$\mu$. Taking for the value $$E_{1\,cm.}^{1\%}$$

that of the malvidine which is 1000, a rate of 0.05 at 0.02 per 100 in the plant is arrived at, 0.25 at 1 per 100 in the product 1 (rough) at 1.4 to 5 per 100 in the purified product 2. Malvidine represents aglucone in the major portion of the anthocyanes present in the plant and it exists in the form of monoglucoside principally, according to chromatographic analysis.

The absorption spectrum of the solution of flavones is found to be between 400 m$\mu$ and 230 m$\mu$. The characteristic curve has two maxima, one at 367–370 m$\mu$ and the other at 255 m$\mu$. By taking the value $$E_{1\,cm.}^{1\%} = 630$$

of quercetine, aglucone of the major portion of the flavonosides present in the plant, 3 to 6 per 100 in product (1) and 15 to 30 per 100 in the purified product (2). The differences in content generally stem from variations in the primary materials.

The accompanying drawings represent the spectrophotometric curves corresponding to the above double analysis and in which.

Figure 2:
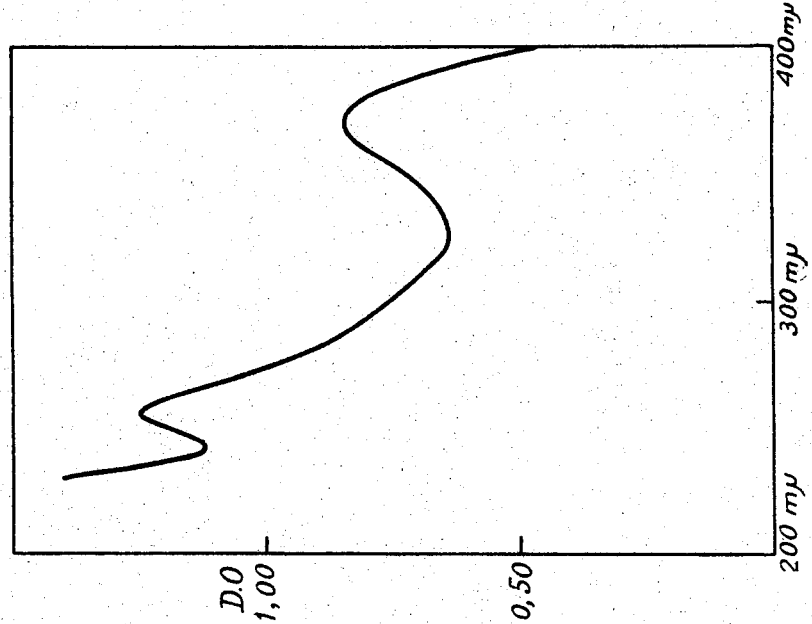
FIGURE 2 shows the absorption spectrum of the solution of flavone.
Figure 1:
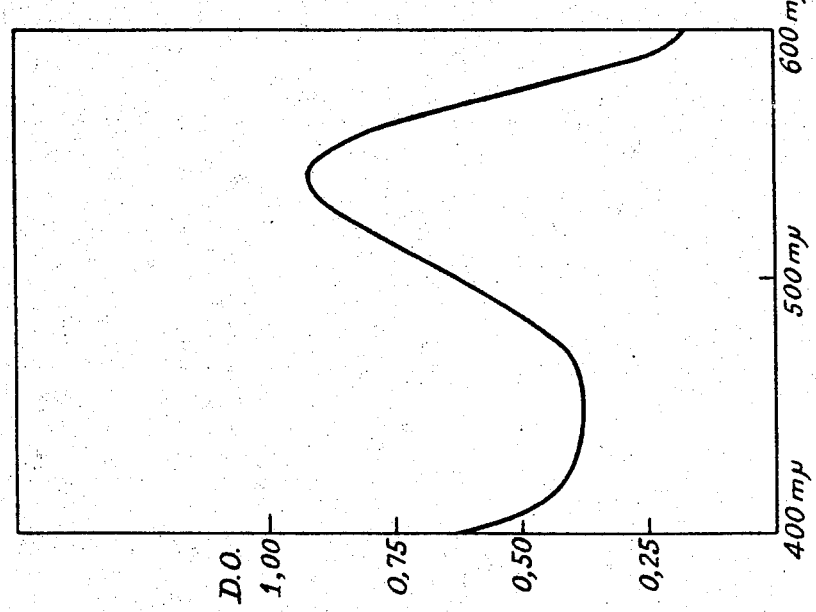
FIG. 1 shows the absorption spectrum of the solution of anthocyanine.

To summarise, the product according to the invention is defined by a high content of anthocyanosides and flavonosides, a content which is determined by the analytical technique described above.

On the other hand, this analytical technique has allowed it to be determined that the products 1 and 2 thus obtained are perfectly stable in the course of time and that in 6 months, for example, their anthocyane and flavone content has not varied more than 5 per 100 at most.

The same is true for the pharmaceutical forms and in particular the liquid forms, the content of active agents of which has not altered as much from the point of view of chemical determination as from the measurement of physiological activity such as the spasmolytic activity.

The second control operation is that of ensuring that the pharmaceutical actions of the leaf are maintained in the course of extraction and are present in extracts 1 and 2. This activity may be proved by conventional tests as follows:

The antihyaluronidasic action on mice.

The action on the capillary resistance of guinea pigs which are lacking in a vitamin.

The spasmolytic action on the contraction of the isolated organ.

A. Antihyaluronidasic Action on Mice

A. Experimental procedure:

(a) Intravenously (extract No. 2):

Injection, 30 minutes before the test, of a given quantity of the extract dissolved in sodium chloride at 9 per 1000.

Injection into the subcutaneous tissue of the skin of the abdomen of the mouse.

On the left hand side: 0.10 ml. of Indian ink at 1 per 100 in sodium chloride at 9 per 1000;

On the right hand side: 0.10 ml. of Indian ink at 1 per 100 in sodium chloride at 9 per 1000 + 1, 2, 3 or 4 I.U. of hyaluronidase at 150 I.U./mg.

(b) Orally (Extract No. 1): Administration, to mice, for three consecutive days, by probang, of the solution of Extract No. 1 or of the infusion of red vine leaf.

The third day, 1 hour 45 minutes after the last administration, injection as above of Indian ink and hyaluronidase.

(c) Reading of the results: Forty-five minutes after the subcutaneous injections, the animals are killed and, after having slit the skin of the abdomen at its midportion, the skin is folded back over a plate of cork and the stains on the right hand and left hand sides are compared.

In the absence of an inhibitor the hyaluronidase brings about a diffusion of the Indian ink; the left hand stain is less extensive than the right hand stain.

B. Results: The following table shows the results of these experiments. The + sign indicates an antihyaluronidasic activity, the − sign indicates the absence of activity: the ± sign indicates a result which can be interpreted neither one way nor the other.

The experiment was carried out on about 350 mice.

| Hyaluronidase in I.U./kg. | Extract No. 1 via the bone | | Extract No. 2, I. V. | | Vine leaf (filtered Infusion) | |
|---|---|---|---|---|---|---|
|  | 10 mg./kg. | 25 mg./kg. | 5 mg./kg. | 10 mg./kg. | 100 mg./kg. | 250 mg./kg. |
| 1 | + | + | + | + | + | + |
| 2 | + | + | + | + | ± | + |
| 3 | ± | + | ± | + | − | + |
| 4 | − | + | − | ± | − | ± |

B. Action on the Capillary Resistance of Guinea Pigs Deficient in a Vitamin

A. Experimental procedure: A deficiency in vitamin C was obtained by the Burr and Burr diet with proportions of vitamins constituted by the vitamins A, D, E, B, $B_2$, $B_6$ and 10 mg./kg. of vitamin C. In theory only the deficiency factor $C_2$ is lacking and in spite of the vitamin C content the diet tends to produce scurvy.

The experiments were carried out on 100 guinea pigs, the capillary resistance of which, measured with Professor Parrot's praximeter, was, at the beginning, and in all cases, equal or greater than 30 cm. of mercury.

When they were considered sufficiently deficient in vitamins, the animals had a capillary resistance at the end of the experiment equal to or less than 10 cm. mercury. The capillary resistance was taken on the skin at the level of the gluteal muscle.

After the breaking down of the capillary resistance at the end of the vitamin deficiency, the products to be tested were administered intraperitoneally. Varied doses of Extract No. 2 were injected for three days. On the third day the capillary resistance was measured 2 hours after the last injection.

B. Results: These are collected in the table below. For each dose the results are given for a group of 5 to 10 guinea pigs.

| Capillary resistance in cm. of mercury | Red vine extract No. 2 injectable solution, intraperitoneal | | | Red vine leaf, solution obtained after filtration | |
|---|---|---|---|---|---|
|  | 10 mg./kg. | 20 mg./kg. | 50 mg./kg. | 250 mg./kg. | 500 mg./kg. |
| 10 |  |  |  |  |  |
| 15 |  |  |  |  |  |
| 20 | ↓ | ↓ | ↓ | ↓ | ↓ |
| 25 |  |  |  |  |  |
| 30 |  |  |  |  |  |
| 35 |  |  |  |  |  |
| 40 |  |  |  |  |  |
| 45 |  |  | ↓ and above |  |  |

C. Spasmolytic Action on the Isolated Ileum of a Guinea Pig

A. Experimental procedure: The musculotropic spasmolytic activity was measured on the ileum of a male guinea pig, which had been starved for 48 hours, according to the Gaddum technique using a 5 ml. tank. The spasmolytic activity was evaluated in relation to the papaverine hydrochlorate with regard to the contractions brought about by doses of 10 and 100 grams of barium chloride according to the sensivity of the organ.

B. Results:

Quantity equivalent to the activity of $1\gamma$ of papaverine

Vine leaf (in infusion) _____ 0.5 to 1 mg.
Extract No. 1 _____ 60 to $100\gamma$.
Extract No. 2 _____ 10 to $20\gamma$.

Thus the physiological experiments allowed the value of the red vine and its extracts to be demonstrated.

EXAMPLE 1

500 grams of leaves, picked as indicated above, were introduced into a laboratory apparatus of the Grignard type. 3.5 litres of alcohol at 70% were added and, under constant agitation, it was taken to boiling point, so that the condensate flowed back, for 45 minutes. It was cooled to 40–50° C. and 25 ml. of pure hydrochloric acid added. Agitation and heating to 40–50° C. lasted for 2 hours. The filtrate was extracted and to it were added 2 grams of ascorbic acid.

2 litres of 70% alcohol were added once more to the marcs and extraction was once more carried out under agitation for 2 hours at 40–50° C. The new filtrate was extracted and added to the first and they were evaporated in vacuo at 40° C.

The soft extract obtained was dissolved under agitation by 500 ml. of water at 1 per 1000 of hydrochloric acid taken to about 90° C. The suspension was spun in a drier and the solution taken by concentration in vacuo to 30 per 100 and then atomised (Extract No. 2).

In order to purify the product and to render it injectable, the solution was saturated before atomisation with sodium chloride. The precipitate of tannoids was eliminated by centrifuging and the aqueous solution was extracted in a counter-current apparatus with n butanol containing 1 per 100 of hydrochloric acid. The sodium chloride was separated by filtration and then the butanol dehydrated by passing it over a layer of anhydrous sodium sulphate. The acid butanolic solution was concentrated at a low temperature to $\frac{1}{10}$ of its original volume. Finally 10 volumes of petroleum ether were added to the butanolic solution.

All the pigments were precipitated in the form of a dark red crystalline powder (Extract No. 2).

These two extracts served as raw materials for the preparation of pharmaceutical substances in the following way:

EXAMPLE 2

50 grams of atomisate were dissolved by agitation with 250 ml. of a mixture of alcohol, propylene glycol and water. The solution was filtered and conserved in a well-stoppered flask. 1 ml. of this solution is equivalent to about 2 grams of dry plant. This solution may be used for buccal administration.

EXAMPLE 3

100 grams of atomisate were mixed with the following powder:

| | Grams |
|---|---|
| Amidon | 10 |
| Lactose | 50 |
| Kaolin | 20 |
| Levilite | 10 |
| Magnesium stearate talc | 10 |

This was granulated when dry, coating was added to 0.4 gram and a pill was obtained containing 0.1 gram of red vine atomisate.

EXAMPLE 4

100 grams of atomisate were moistened with sugar syrup and then granulated with enough sugar to form a granulated sugary preparation with 10 per 100 of red vine atomisate.

EXAMPLE 5

100 grams of atomisate were mixed with 2.9 kilograms of an excipient for suppositories. The excipient can be either a eutectical mixture of fatty acid or glyceric esters of trilauric acid.

The suppositories contained 0.2 gram of red vine atomisate.

EXAMPLE 6

The following substances were heated to 80° C.:

| | Grams |
|---|---|
| Tween 20 | 60 |
| Span 60 | 100 |
| Stearic acid | 125 | and there were then added:

| | Grams |
|---|---|
| Nipagine | 2 |
| Nipasol | 3 |
| Water | 500 |

These substances were well mixed and left to cool to 35 to 40°. 20 grams of atomisate of red vine put suspended in water were added, and the whole incorporated by agitation. This was then made up to 1000 grams with water and homogenised. 100 grams of ointment contained 2 grams of atomisate. The ointment may also contain medicating ingredients such as derivatives of heparine, hydrocortisone or extract of *Hirudo medicinalis*.

EXAMPLE 7

Extract 2 was dissolved in a tampon solution of pH varying between 6.5 and 7.5 so that 1 ml. of that dissolved corresponds to 3 grams of plant. The solution was sterilised by filtration and antiseptically decanted into ampoules.

What I claim is:

1. Method for preparing a stable concentrated extract of the dyeing variety of red vine (*Vitis vinifera*) comprising the steps of drying and crushing leaves of said red vine, extracting said dried and crushed leaves by means of a warm hydroalcoholic solvent cooling and acidifying the resulting raw mixture filtering the liquid from said mixture, and distilling in vacuo the filtered liquid in the presence of a reducing agent.

2. Method as in claim 1, in which said hydroalcoholic solvent has an alcohol content of 50 to 80% by weight and the temperature of the extraction step is of 50–60° C.

3. Method as in claim 1, in which the reagent used for acidifying the extraction mixture is an acid at a proportion of 1 to 5 parts by volume of acid for 1000 parts by volume at a temperature of 40–50° C. and for a duration of 1 to 5 hours until a discolouration is attained.

4. Method as in claim 1, in which the vacuo distillation is carried out at a temperature of 20 to 50° C. and the reducing agent is used in a ratio of 1 to 5% by weight of the dry extract.

5. Method for preparing a stable concentrated extract of the dyeing variety of red vine (*Vitis vinifera*) comprising the steps of drying and crushing leaves of said red vine, extracting said dried and crushed leaves by means of a hydroalcoholic solvent containing 50 to 80% by weight of alcohol at a temperature of 50–60° C., cooling the resulting raw mixture, acidifying said mixture by means of an acid used in a ratio of 1 to 5 parts for 1000 parts by volume of said mixture at a temperature of 40–50° C. for 1 to 5 hours, filtering said acidified mixture and distilling in vacuo the filtered liquid at a temperature of 20 to 50° C. in the presence of 1 to 5% by weight on a dry basis of a reducing agent.

6. Method as in claim 5, in which the distilled product is further purified by extraction and concentrated until a dry stable product is obtained.

7. The method which comprises:
(a) extracting dried leaves of the dyeing variety of Vitis vinifera with a hydroalcoholic solvent containing 50 to 80% by weight of alcohol at a temperature of 50–60° C.,
(b) cooling the resulting raw mixture,
(c) acidifying said mixture with an acid in an amount of 1 to 5 parts per 1000 parts by volume of the mixture at a temperature of 40–50° C., and agitating the same for 1 to 5 hours,
(d) filtering said acidified mixture,
(e) vacuum distilling the filtrate at a temperature of 20 to 50° C. in the presence of 1 to 5%, by weight on a dry basis with respect to the distillation residue, of a reducing agent.

8. Method in accordance with claim 7 wherein the distillation residue is further extracted by an extracting solvent; and the obtained extract is concentrated until a dry stable product is obtained.

9. The product obtained by the method of claim 1.

10. A composition comprising the product of claim 9 and a pharmaceutically acceptable diluent.

11. A composition comprising the product of claim 9 and a pharmaceutically acceptable injectable diluent.

References Cited in the file of this patent

UNITED STATES PATENTS

| 30,834 | Popp | Dec. 4, 1860 |
| 126,363 | Whiteley | Apr. 20, 1872 |
| 130,282 | Damken | Aug. 6, 1872 |
| 409,859 | Nellensteyn | Aug. 27, 1889 |
| 1,401,351 | Monti | Dec. 27, 1921 |
| 1,602,162 | Monti | Oct. 5, 1926 |
| 2,865,756 | Merory | Dec. 23, 1958 |
| 2,991,180 | Faure | July 4, 1961 |

OTHER REFERENCES

Hocking: "A Dictionary of Terms Used in Pharmacognosy," pages XI–XXIV, and page 243, entry "*Vitis vinifera*," published 1955 by Charles C. Thomas Co., Springfield, Illinois.